US008761017B2

(12) United States Patent
Pechanec et al.

(10) Patent No.: US 8,761,017 B2
(45) Date of Patent: Jun. 24, 2014

(54) TRANSPORT COST OPTIMIZATION FOR ENTERPRISE SERVICE

(75) Inventors: Jiri Pechanec, Mokra-Horakov (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 337 days.

(21) Appl. No.: 12/787,313

(22) Filed: May 25, 2010

(65) Prior Publication Data

US 2011/0295956 A1     Dec. 1, 2011

(51) Int. Cl.
*G06F 11/00*     (2006.01)
*H04L 12/26*     (2006.01)
*G06F 15/16*     (2006.01)

(52) U.S. Cl.
USPC ............ 370/235; 370/238; 709/232; 709/206

(58) Field of Classification Search
None
See application file for complete search history.

(56) References Cited

U.S. PATENT DOCUMENTS

| | | | | |
|---|---|---|---|---|
| 6,430,273 | B1 * | 8/2002 | Shaheen | 379/93.14 |
| 6,556,668 | B1 * | 4/2003 | Achuthan et al. | 379/114.01 |
| 6,785,724 | B1 * | 8/2004 | Drainville et al. | 709/227 |
| 6,934,249 | B1 * | 8/2005 | Bertin et al. | 370/218 |
| 7,881,661 | B2 * | 2/2011 | Mohammadioun et al. | 455/12.1 |
| 8,155,693 | B2 * | 4/2012 | Karaoguz | 455/552.1 |
| 2007/0183402 | A1 * | 8/2007 | Bennett et al. | 370/352 |
| 2008/0069082 | A1 * | 3/2008 | Patrick | 370/351 |
| 2008/0205271 | A1 * | 8/2008 | Aissaoui et al. | 370/235 |
| 2011/0167182 | A1 * | 7/2011 | Palin et al. | 710/105 |

OTHER PUBLICATIONS

Jboss ESB 4.7, Services Guide, 74 pgs, Nov. 24, 2009.
http://www.jboss.org/jbossesb/resources/WhatIsAnESB.html, Jboxx ESB, "What is an ESB?", 2 pgs, May 25, 2010.

* cited by examiner

*Primary Examiner* — Wen-Tai Lin
(74) *Attorney, Agent, or Firm* — Lowenstein Sandler LLP (57) ABSTRACT

A communication controller optimizes transport costs so as to minimize the cost of transmitting message. The communication controller receives a message and calculates the cost of transmitting the message based on a setup cost and a transmission cost. The communications controller selects a communication pathway that has the least cost as the pathway to transmit the message. If the pathway is not established, the communications controller establishes this communication pathway and transmits the message.

18 Claims, 5 Drawing Sheets

TRANSPORT COST OPTIMIZATION FOR ENTERPRISE SERVICE

TECHNICAL FIELD

Embodiments of the present invention relate to a method and system for communicating messages using an enterprise service bus. Specifically, embodiments of the invention relate to optimizing the transport cost of the messages communicated using the enterprise service bus.

BACKGROUND

A service oriented architecture (SOA) enables enterprises to integrate services, handle business events, and automate business processes more efficiently. For example, an SOA links information technology resources, data, services, and applications. An SOA can include an enterprise service bus (ESB). An ESB is an event-driven and standards-based messaging engine that provides services for more complex architectures. The ESB provides infrastructure that links together service and clients to enable distributed applications and processes. For example, an ESB can include one or more buses that logically interconnect available services and clients.

A mobile ESB client can utilize different transport protocols to communicate ESB messages. For example, the portable devices can typically communicate messages using different transport protocols such as Short Message Service (SMS), General Packet Radio Service (GRPS)/Enhanced Data Rates for GSM Evolution (EDGE), Universal Mobile Telecommunications System (UMTS), Wi-Fi (e.g., IEEE 802.11a, 802.11b, 802.11g, 802.11n, WIMAX, etc.), Circuit Switched Data (CSD), or other types of transport protocol as known in the art. Each of these transports has associated costs that relates to connection setup, connection time, size of transmitted data etc. If the portable device is registered to ESB it would be useful to optimize message routing based on the available connections and minimal costs for transmission.

DETAILED DESCRIPTION

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

A portable device and/or server that optimizes the transport costs associated with communicating enterprise service bus messages is described. In one embodiment, each of the portable device and the server include a communications controller. The communication controller receives a message and calculates the cost of transmitting the message based on a setup cost and a transmission cost. The communications controller selects a communication pathway that has the least cost as the pathway to transmit this message. If the pathway is not established, the communications controller establishes this communication pathway and transmits the message.

Figure 1:
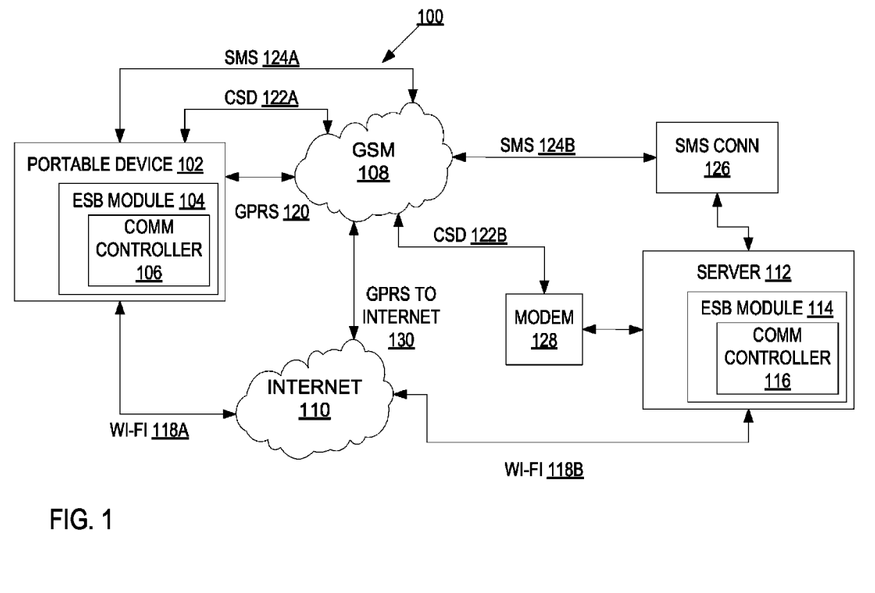
FIG. 1 is a block diagram of one embodiment of a system that includes a portable device communicating messages with a server.

FIG. 1 is a block diagram of one embodiment of a system 100 that includes a portable device 102 that communicates messages with a server 112. In FIG. 1, the portable device 102 can communicate enterprise service bus (ESB) message with the sever 112 using a variety of different communication pathways. For example, the mobile client can communicate ESB messages using SMS 124A-B, CSD 122A-B, or GPRS 120 through the GSM cloud 108 that couples the portable device 102 and the server 112. As is known in the art, GSM is a cellular network that is capable of supporting telephony and data services. In addition, the server 112 is coupled with a SMS connector 126 to couple the server to SMS networking infrastructure. Server 112 is further coupled to the GSM cloud 108 via a modem 128 to communication using the CSD 122B transport protocol.

In one embodiment, the portable device 102 is a smartphone, cellular phone, portable music player, tablet, laptop, portable game console, appliances (e.g., refrigerator, TV, etc.), DVB receiver and other types of consumer electronics that can be networked. or any other type of portable computing device. In one embodiment, the server 112 is a server computer, personal computer, desktop computer, mainframe computer, or any other type of computing device that can act as an ESB server.

In addition, the portable device 102 is furthered coupled to the server via the Internet 110 using a Wi-Fi connection 118A-B. The portable device 102 can communicate with the server 112 through a network interconnection 130 between the GSM 108 and Internet network 110. This interconnection 130 allows the potable device 102 to send an ESB message in SMS 124A, for example, and have the server 112 receive this message through an Internet based medium, such as Wi-Fi 118B. With this interconnection 130, other combinations of GSM 108-Internet 110 communication pathways are possible.

In one embodiment, the portable device 102 registers itself with endpoints that the portable device 102 receive data from. In one embodiment, each ESB node (e.g., portable device 102, server 112, etc.) contains a component service registry to which each ESB node registers services it provides and transports by which they are achievable. In one embodiment, the server 112 is an endpoint for the portable device 102. In another embodiment, the portable device 102 is an endpoint from the server 112. For example, in one embodiment, the portable device 102 registers itself with the server 112 by using a phone number for SMS or CSD, an internet protocol (IP) address for GPRS accessibility, an IP address for Wi-Fi availability. Once the portable device 102 and/or server 112 establishes an endpoint, a communication pathway is setup between the two devices using one of the transport protocols. In one embodiment, a communication pathway is connection between the portable device 102 and the server 102 and/or other endpoints using one of the transport protocols. For example in one embodiment, in FIG. 1, there can be an SMS 124A-B, CSD 122A-B, GPRS 120, and/or Wi-Fi 118A-B communication pathways between portable device 102 and the server 112. Furthermore, the portable device 102 and/or server 112 can have established and unestablished communication pathways. An established communication pathway means that this pathway is ready to communicate messages. An unestablished communication pathway is a communication pathway that has to be setup before that pathway can communicate messages. An available communication pathway can be an established or unestablished communication pathway.

In one embodiment, each of the portable device 102 and server 112 include an ESB module (ESB modules 104 and 114 for portable device 102 and server 112, respectively) that formats the message for transport using the ESB. Each ESB module further includes a communications controller that calculates costs for establishing connection and cost to transmit each particular message and transmits that message (communications controllers 106 and 116 for portable device 102 and server 112, respectively).

In one embodiment, if the portable device 102 is to transmit a message, the portable device 102 calculates a cost for transmitting that message and selects an appropriate transport to minimize the costs. If the selected connection is not established, the portable device 102 can further calculate the cost to establish another communication pathway. The portable device 102 can further calculate a transport cost based on a characteristic and costs of future messages based on the analysis of historical data (e.g., previous messages sent). For example and in one embodiment, portable device 102 can determine the average number of message sent in a given hour of the day. Based on this data the portable device 102 can decide if is better to establish the communication pathway that would be cheaper for many messages or use a more expensive communication pathway as an exception for a few messages.

In one embodiment, the server 112 includes the similar functionality for optimizing transport cost. Furthermore, the server 112 includes a minimal communication pathway that is used to communicate control information with the portable device 102. In one embodiment, this minimal communication pathway is also known as an emergency, control, and/or signaling communication pathway. For example in one embodiment, the server 112 can use SMS as the minimal communication pathway with the portable device 102. In one embodiment, if the server 112 determines that an unestablished communication pathway should be the selected communication pathway for the message, the server 112 can transmit a signaling/control message over this minimal channel to request that the portable device 102 to set-up the selected communication pathway. In one embodiment, the server 112 can provide a list of transports that are ordered by costs so that the portable device 102 can select the cheapest communication pathway that is available. In one embodiment, if the signaling/control message to be transmitted is small and the cost for control channel transmission is low, then this message can be sent directly over the control channel.

In one embodiment, optimizing the transport costs can be used systems that are connected to an ESB from underdeveloped/uncivilized parts of world. In this embodiment, the transport costs can utilize other types of communication pathways, such as satellite connections, public switched telecommunications networks (PSTN) lines, etc.

As described above, there are several different communication pathways (SMS, CSD, GPRS, Wi-Fi, etc., and/or a combination thereof) that the portable device 102 can use to send and receive ESB messages with the server 112. Because each of the communication pathways uses different technologies and supporting infrastructure, each of the communication pathways has a different cost to communicate an ESB message. In one embodiment, a cost is determined based on a connection setup cost and cost per byte transmission. In this embodiment, a setup cost is cost to setup the communication pathway to transmit that message. In one embodiment, some communication pathways do not have setup cost such as Wi-Fi. This is because the connection setup is established when the service is brought up and this communication pathway active and ready to use.

In one embodiment, In one embodiment, a transport cost for a message can be calculated as in Equation (1):

$$transportCost = setupCost + (numBytes * transmissionCost) \quad (1)$$

While in this embodiment, the transport cost is calculated based on the setup cost and the transmission cost, in alternate embodiment, the same or different cost factors could be used to calculate transport cost (connection time, quality of service factors, etc.). For example in one embodiment, a transport cost based on connection time for a message could be calculated as in Equation (2):

$$transportCost = setupCost + \left(\left(\frac{numBytes}{transmissionSpeed}\right) * transmissionCost\right). \quad (2)$$

In another example and embodiment, a transport cost based on quality of server (QoS) could be calculated as in Equation (3):

$$transportCost = \left(\frac{idealTransportCost}{probLosingAndResendingMessage}\right) * (1 - bestQoS). \quad (3)$$

In this embodiment, the transport cost is lower for lesser quality of server than for a more reliable quality of service. In this embodiment, the transport cost is based on a set of cost factors for each of the different communication pathways. Example setup and transmission costs are illustrated in Table 1, below.

TABLE 1

Example setup and transmission cost for different communication pathways.

| Communication Pathway | Cost for connection setup | Cost for byte transmission |
|---|---|---|
| SMS | 0 | 10 |
| GPRS | 0 | 1 |
| Wi-Fi | 10 | 0.01 |
| CSD | 2000 | 0 |

In this embodiment, communication pathways SMS and GPRS have no setup cost with only transmission costs. Wi-Fi and CSD communication pathways that do have a setup cost (Wi-Fi, CSD). These costs suggest that SMS and GPRS could be used for short ESB messages (e.g., message that have a small number of bytes), whereas Wi-Fi and CSD might be better suited for ESB messages that are larger (e.g., message with a large number of bytes).

Using on the cost table above (Table 1), different examples are described to illustrate the cost calculations. For example in one embodiment, the portable device 102 is not connected or using any communication pathway except for SMS. In this example, the portable device 102 is to transfer a one kilobyte ESB message. The resulting cost table for this message is in Table 2 below.

TABLE 2

Cost table to transport a one kilobyte message.

| Communication Pathway | Cost for connection setup | Cost for transmission | Total costs |
|---|---|---|---|
| SMS | 0 | 10000 | 10000 |
| GPRS | 0 | 1000 | 1000 |
| Wi-Fi | 10 | 10 | 20 |
| CSD | 2000 | 0 | 2000 |

In this example, the selected communication pathway would be Wi-Fi. If Wi-Fi not available, GPRS would be the next suitable communication pathway. In an alternate embodiment, if there is historical data suggesting that a one kilobyte message of a certain type is followed by many other messages, the CSD communication pathway may be a better choice. For example in one embodiment, transmission of a large video clip would be an example of a large number of ESB messages that may warrant the setup cost of the CSD communication pathway.

In another example, the portable device 102 is connected using GPRS and SMS. In this example, the server 112 is to transmit a ten kilobyte message to the portable device 102. The resulting transport cost table for this message is in Table 3 below.

TABLE 3

Cost table to transport a ten kilobyte message.

| Communication Pathway | Cost for connection setup | Cost for transmission | Total costs |
|---|---|---|---|
| SMS | 0 | 100000 | 100000 |
| GPRS | 0 | 10000 | 10000 |
| Wi-Fi | 10 | 100 | 120 |
| CSD | 2000 | 0 | 2000 |

In this embodiment, the Wi-Fi communication pathway is the least expensive communication pathway. Because the portable device 102 is not connected to the Wi-Fi communication pathway, the server 112 sends over SMS a request to connect to the network using Wi-Fi. In this example, SMS is the minimal communication channel between the server 112 and the portable device 102. If the Wi-Fi connection is available, the portable device 102 registers its new transport to the server 112 and a message is deliver over Wi-Fi. In this embodiment, if the server 112 did not expect to send more than three of the ten kilobyte messages, for example, the Wi-Fi communication pathway is preferred. If the server 112 would expect, say, more than twenty of the ten kilobytes messages to be sent or if the Wi-Fi communication pathway was not be available, then the connection over CSD would be created.

Figure 2:
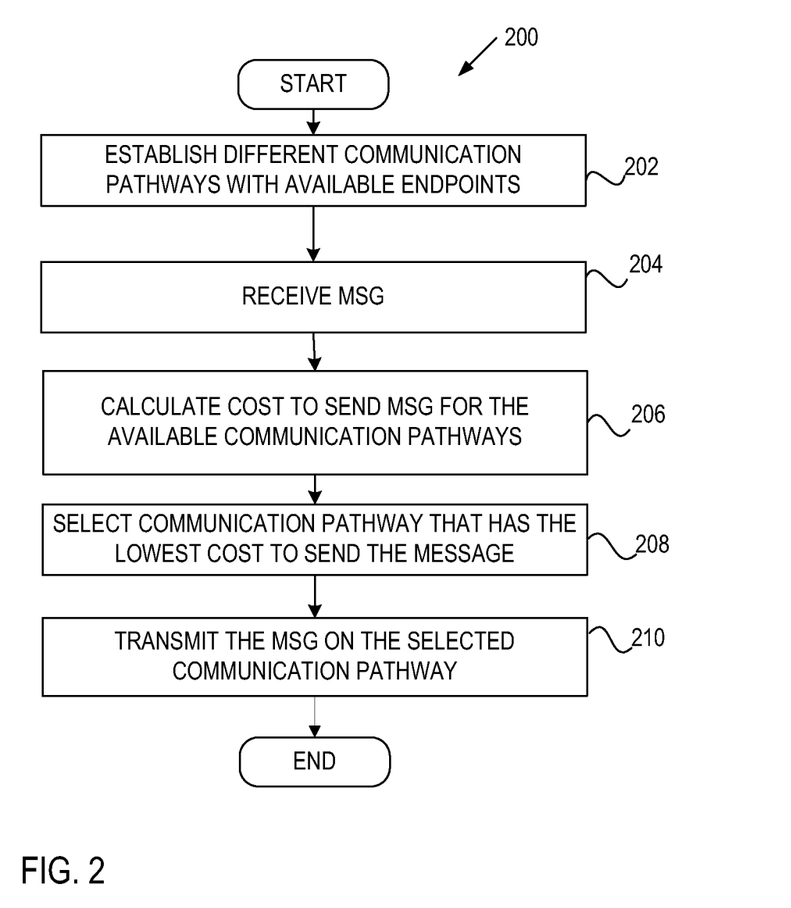
FIG. 2 is a flowchart of one embodiment of a process for optimizing the transport costs associated with communicating the messages.

FIG. 2 is a flowchart of one embodiment of a process 200 for optimizing the transport costs associated with communicating enterprise service bus messages. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 200 is performed by a device that communicates ESB messages, such as portable device 102 or the server 112 of FIG. 1.

Referring to FIG. 2, process 200 begins with processing logic establishing different communication pathways with available endpoints at block 202. In one embodiment, process 200 establishes different communication pathways that are available to the portable device. For example in one embodiment, process 200 establishes connections with the server 112 for SMS and GPRS as described above with reference to FIG. 1. Process 200 can establish some, all, or none of the available communication pathways available to the available endpoints. In this embodiment, if process 200 is executing on the portable device 102, the server 112 is the endpoint for the portable device 102. Alternatively, if process 200 is executing on the server 112, the portable device is the endpoint for the server 112.

At block 204, process 200 receives the message that process 200 will later transmit. While in one embodiment, process 200 receives an ESB message, in alternate embodiments, process 200 can receive (and later transmit) other types of messages known in the art.

Process 200 calculates the cost to send the message for the available communication pathways at block 206. In one embodiment, process 200 calculates the transport costs based on the setup and transmission cost as described above in FIG. 1 using Equation (1) above. Alternatively, process 200 can calculate the costs using the same and/or different factors (connection time, quality of service, etc.). For example in one embodiment, process 200 calculates a cost to transmit a one kilobyte for SMS (10000), GPRS (1000), Wi-Fi (20), and CSD (2000) as described in FIG. 1 above. In another example, process 200 calculates a cost to transport a ten kilobyte message for SMS (100000), GPRS (10000), Wi-Fi (120), and CSD (2000) as described in FIG. 1 above.

At block 208, process 200 selects the communication pathway that has the lowest cost to transmit the message. For example in one embodiment, process 200 selects Wi-Fi as the preferred communication pathway to transmit a one or ten kilobyte message as described in FIG. 1 above. If the initially selected communication pathway is not available, process 200 selects the next lowest cost communication pathways.

Process 200 transmits the received message at block 210 using the selected communication pathway. Transmitting the message is further described in FIG. 3 below.

Figure 3:
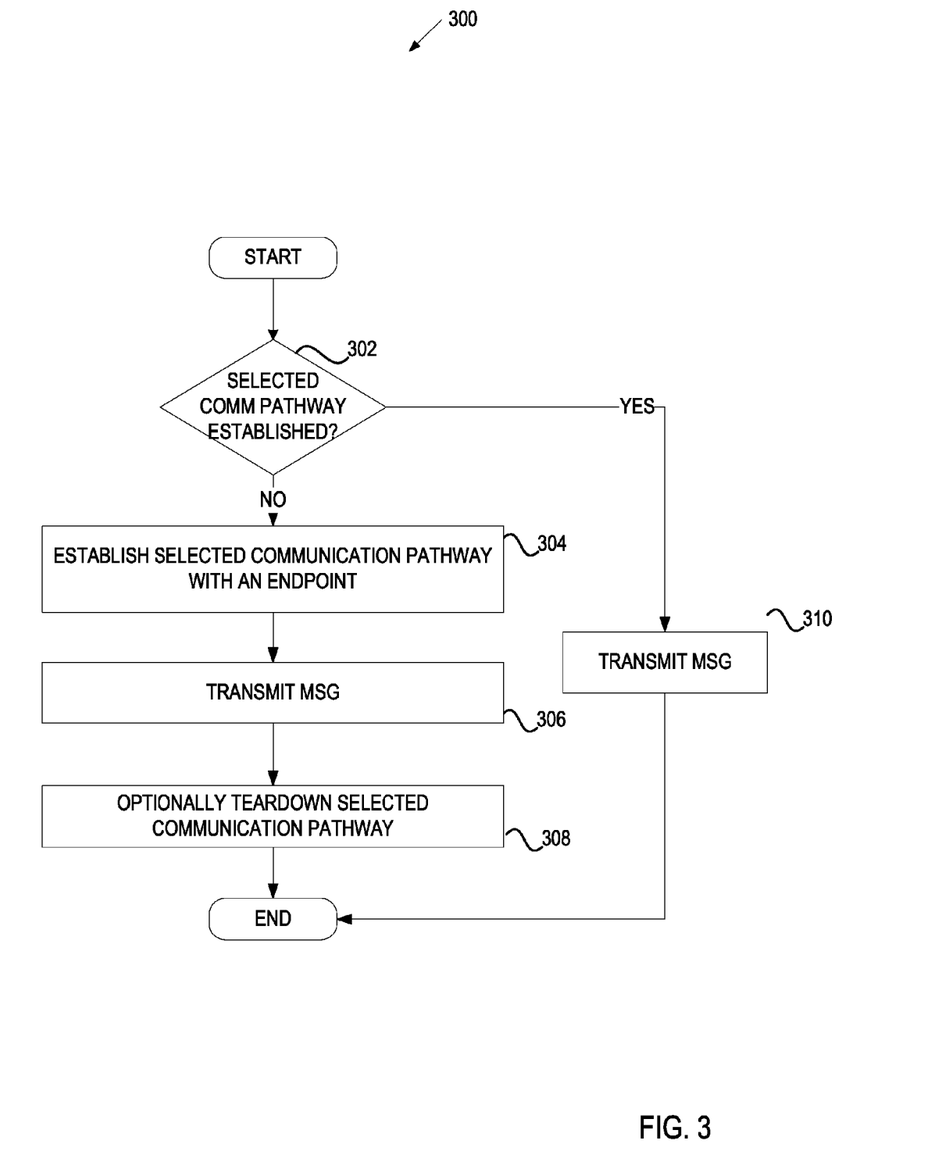
FIG. 3 is a flowchart of one embodiment of a process for transmitting a message using the selected communication pathway.

FIG. 3 is a flowchart of one embodiment of a process 300 for transmitting a message using the selected communication pathway. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a device that communicates ESB messages, such as portable device 102 or the server 112 of FIG. 1.

Referring to FIG. 3, process 300 begins with processing logic determining is the selected communication pathway is established. In one embodiment, a communication pathway is established by assigning a phone number for SMS or CSD, an internet protocol (IP) address for GPRS accessibility, IP address Wi-Fi availability, etc. If the selected communication pathway is established, process 300 transmits the message using the selected communication pathway. In one embodiment, process 300 transmits the message using the ESB module 114 and communications controller 116 as described above in FIG. 1.

If the selected communication is not established, process 300 establishes the communication pathway at block 304. In one embodiment, if process 300 is executed with a portable device 300, process 300 establishes the communication pathway using one of the ways to establishing a communications channel as known in the art for the different communication pathways (SMS, GPRS, CSD, Wi-Fi, etc.). In another embodiment, if process 300 is executed by the server 112, process 300 sends a message using a communication pathway other than the selected communication pathway to the portable device 102. In this embodiment, the message transmitted by process 300 is a request to establish the selected communication pathway. For example in one embodiment, process 300 transmits an SMS message to the portable device 102, where the SMS message is a request for the portable device 102 to establish Wi-Fi connection. Furthermore, in this embodiment, process 300 receives a message from the portable device 102 indicating to process 300 that the selected communication pathway is established. For example in one embodiment, process 300 receives a message indicating that the portable device 102 has established a Wi-Fi communication pathway.

Process 300 transmits the message using the selected communication pathway at block 306. At block 308, process 300 optionally tears down the selected communication pathway. In one embodiment, process 300 tears down the selected communication pathway based on the historical pattern of network traffic. For example in one embodiment, if the message that process 300 transmits if typically followed by several more messages, process 300 would not tear down the selected communication pathway. An example would be a series of messages transporting a video clip. If process 300 determines that this message is typically not followed by other messages, process 300 would tear down the selected communication pathway. For example in one embodiment, an accounting system that processes in batch invoices and sends results hourly could tear down the selected communication pathway. In this embodiment, this teardown interval can be increased and/or decreased as needed (e.g., change from hourly to six times a day, change from hourly to half-hourly, etc.).

Figure 4:
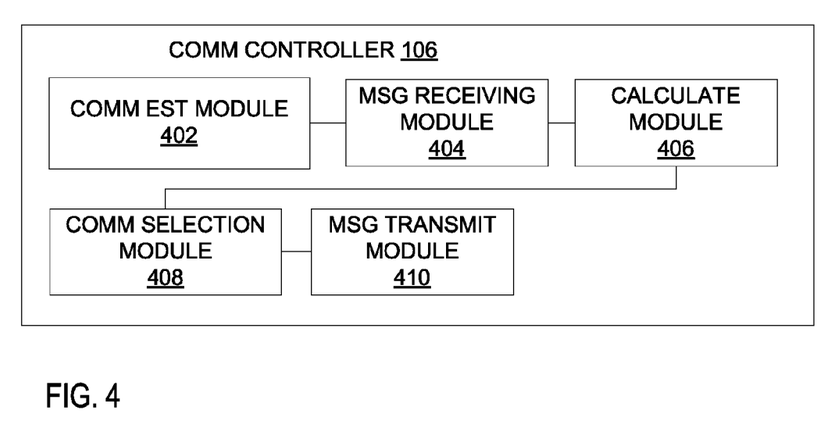
FIG. 4 is a block diagram of a communications controller that optimizes the transport costs associated with communicating enterprise service bus messages.

FIG. 4 is a block diagram of a communications controller 116 that optimizes the transport costs associated with communicating enterprise service bus messages. In FIG. 4, communications controller 106 includes communications establishment module 402, message receiving module 404, calculate module 406, communication selection module 408, and message transmit module 410. Communications establishment module 402 establishes communication pathways as described in FIG. 2, block 202. Message receiving module 404 receives the message as described in FIG. 2, block 204. Calculate module 406 calculates the cost of each available communication pathway as described in FIG. 2, block 206. Communication selection module 408 selects the communication pathway for message transport as described in FIG. 2, block 208. Message transmit module 410 transmit the message as described in FIG. 2, block 210.

Figure 5:
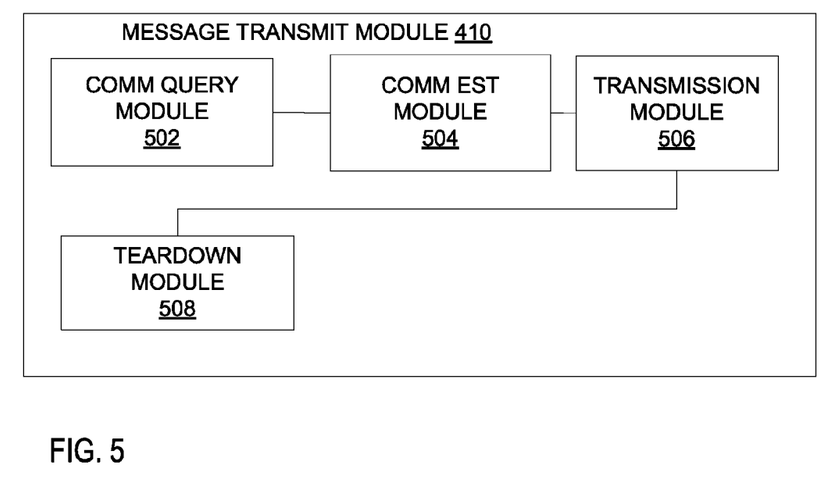
FIG. 5 is a block diagram of a message transmission module that transmits a message using the selected communication pathway.

FIG. 5 is a block diagram of a message transmit module 410 that transmits a message using the selected communication pathway. Message transmit module 410 includes communications query module 502, communication establishment module 504, transmission module 506, and teardown module 508. Communications query module 502 determines if the selected communication pathway is established as described in FIG. 3, block 302. Communication establishment module 504 establishes the as described in FIG. 3, block 304. Transmission module 506 as transmits the message described in FIG. 3, blocks 306 and 310. Teardown module 508 tears down the selected communication pathway as described in FIG. 3, block 308.

Figure 6:
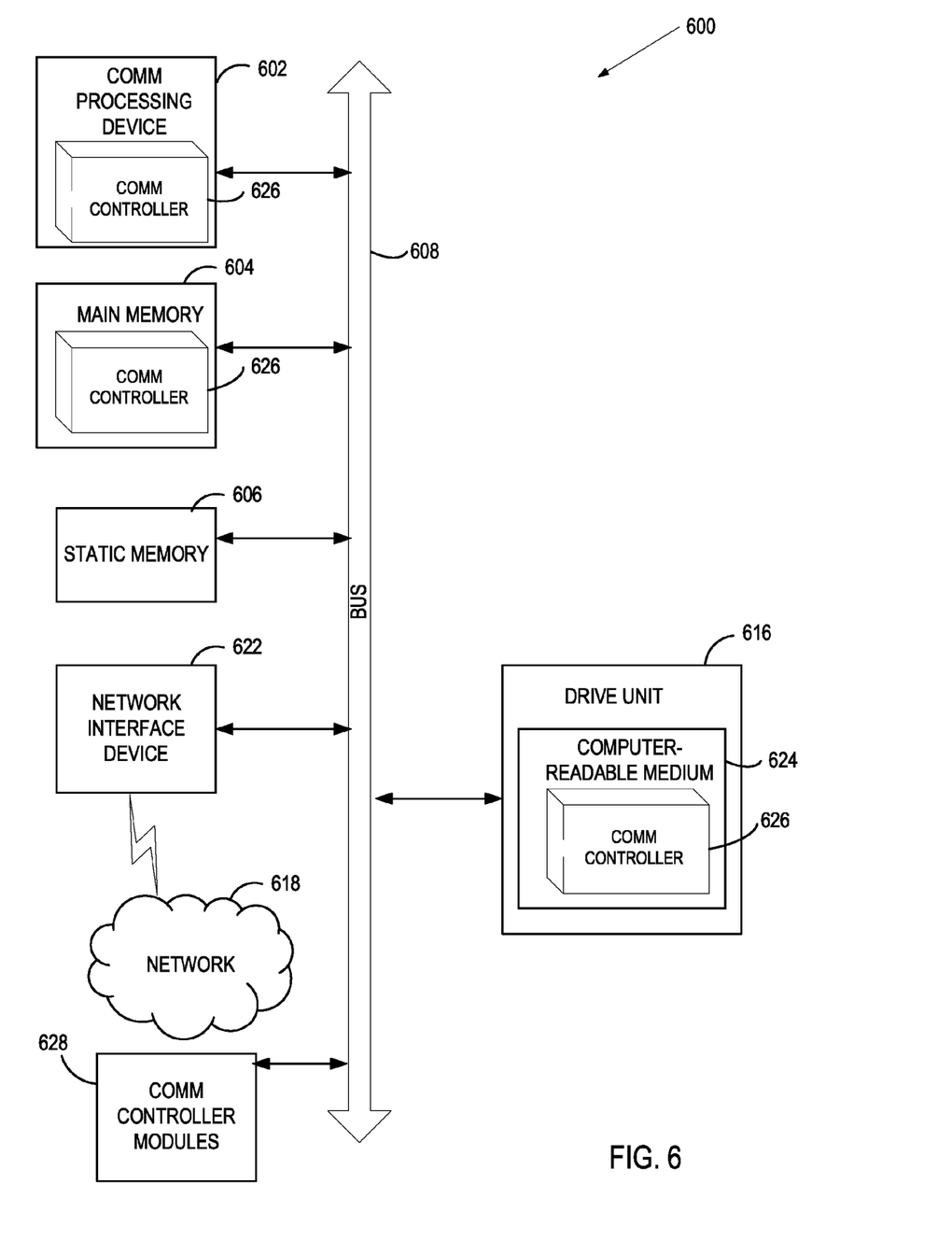
FIG. 6 is a diagram of one embodiment of a communication device for optimizing the transport costs associated with communicating enterprise service bus messages.

FIG. 6 is a diagram of one embodiment of a communication device 600 for optimizing the transport costs associated with communicating enterprise service bus messages. In one embodiment, the communication device 600 can be either the portable device 102 and/or the server 112 of FIG. 1 above. Within the communication device 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer to communicate ESB messages to a server or a server to communicate ESB messages to a client) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a smart phone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary communication device 600 includes a communication processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Communication processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Communication processing device 602 may also be one or more special-purpose processing devices such as an application specific integrated circuit (ASIC), a field programmable gate array (FPGA), a digital signal processor (DSP), network processor, or the like. Rules processing device 602 is configured to execute the test controller 626 for performing the operations and steps discussed herein. The communication device 600 may further include a network interface device 622.

The secondary memory 616 may include a machine-readable storage medium (or more specifically a computer-readable storage medium) 624 on which is stored one or more sets of instructions (e.g., the communications controller 626) embodying any one or more of the methodologies or functions described herein. The communications controller 626 may also reside, completely or at least partially, within the main memory 604 and/or within the communication processing device 602 during execution thereof by the communication device 600, the main memory 604 and the communication processing device 602 also constituting machine-readable storage media. The communications controller 626 may further be transmitted or received over a network 618 via the network interface device 622.

The computer-readable storage medium 624 may also be used to store the communications controller 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The terms "computer-readable storage medium" shall accordingly be taken to include, but not be limited to, solid-state memories, and optical and magnetic media.

The communications controller modules 628, components and other features described herein (for example in relation to FIG. 1) can be implemented as discrete hardware components or integrated in the functionality of hardware components such as ASICS, FPGAs, DSPs or similar devices. In addition, the test controller modules 628 can be implemented as firmware or functional circuitry within hardware devices. Further, the communications controller modules 628 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "calculating," "selecting," "transmitting," "establishing," "communicating," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for transport cost optimization been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
calculating, by a communications device, a cost of transmitting an enterprise service bus message for each of a plurality of available communication pathways, wherein the plurality of available communication pathways comprises established and unestablished communication pathways, wherein an established pathway comprises the communications device having been setup to communicate over a Wi-Fi communication pathway, and wherein an unestablished pathway has to be setup prior to communicating an enterprise service bus message, and a cost of an unestablished communication pathway comprises a cost to establish that communication pathway;
determining a cost for transmitting a control message for a control communication pathway;
transmitting the control message over the control communication pathway when the cost for transmitting the control message is below a threshold; and
selecting one of the plurality of available communication pathways to transmit the enterprise service bus message using the transmitted control message, wherein the selected communication pathway has a lowest one of the plurality of calculated costs.

2. The method of claim 1, further comprising:
establishing at least one of the available communication pathways.

3. The method of claim 1, further comprising:
transmitting the enterprise service bus message using the selected communication pathway, wherein the transmitting comprises:
establishing the selected communication pathway when the selected communication pathway is unestablished, and
transmitting the enterprise service bus message over the established selected communication pathway.

4. The method of claim 3, wherein the establishing comprises:
communicating control information with an established communication pathway, the control information to establish the unestablished communication pathway.

5. The method of claim 1, the unestablished communication pathway to communicate enterprise service bus messages between a portable device and a server.

6. The method of claim 1, wherein the cost of the each of the plurality of communication pathways is in view of a size of the enterprise service bus message.

7. The method of claim 1, wherein the cost of the each of the plurality of communication pathways is in view of a metric that is selected from the group consisting of speed of connection and quality of service corresponding to the enterprise service bus message.

8. A non-transitory computer readable storage medium having instructions stored thereon that, when executed by a communications device, cause the communications device to execute operations comprising:
calculating, by the communications device, a cost of transmitting an enterprise service bus message for each of a plurality of available communication pathways, wherein the plurality of available communication pathways comprises established and unestablished communication pathways, wherein an established pathway comprises the communications device having been setup to communicate over a Wi-Fi communication pathway, and wherein an unestablished pathway has to be setup prior to communicating an enterprise service bus message, and a cost of an unestablished communication pathway comprises a cost to establish that communication pathway;
determining a cost for transmitting a control message for a control communication pathway;
transmitting the control message over the control communication pathway when the cost for transmitting the control message is below a threshold; and
selecting one of the plurality of available communication pathways to transmit the enterprise service bus message using the transmitted control message, wherein the selected communication pathway has a lowest one of the plurality of calculated costs.

9. The non-transitory computer readable storage medium of claim 8, wherein the operations further comprise:
establishing at least one of the available communication pathways.

10. The non-transitory computer readable storage medium of claim 8, wherein the operations further comprise:
transmitting the enterprise service bus message using the selected communication pathway, wherein the transmitting comprises:
establishing the selected communication pathway when the selected communication pathway is unestablished, and
transmitting the enterprise service bus message over the established selected communication pathway.

11. The non-transitory computer readable storage medium of claim 10, wherein the establishing comprises:
communicating control information with an established communication pathway, the control information to establish the unestablished communication pathway.

12. The non-transitory computer readable storage medium of claim 10, the unestablished communication pathway to communicate enterprise service bus messages between a portable device and a server.

13. The non-transitory computer readable storage medium of claim 8, wherein the cost of the each of the plurality of communication pathways is in view of a size of the enterprise service bus message.

14. A device comprising:
a communications device comprising:
a calculation module, coupled to an enterprise service bus message receiving module, to
calculate a cost to receive an enterprise service bus message by an enterprise service bus message receiving module for each of a plurality of available communication pathways, wherein the plurality of available communication pathways comprises established and unestablished communication pathways, wherein an established pathway comprises the communications device having been setup to communicate over a Wi-Fi communication pathway, and wherein an unestablished pathway has to be setup prior to communicating an enterprise service bus message, and a cost of an unestablished communication pathway comprises a cost to establish that communication pathway;
determine a cost for transmitting a control message for a control communication pathway, and
transmit the control message over the control communication pathway when the cost for transmitting the control message is below a threshold; and
a communication selection module, coupled to the calculation module, to select one of the plurality of communication pathways to transmit the enterprise service bus message using the transmitted control message by an enterprise service bus message transmit module, wherein the selected communication pathway has a lowest one of the plurality of calculated costs.

15. The device of claim 14, wherein the enterprise service bus message transmit module comprises:
a communications query module to determine if the selected communication pathway is unestablished;
a communication establishment module, coupled to the communication query module, to establish the selected communication pathway when the established communication pathway is unestablished; and
a transmission module, coupled to the communication establishment module, to transmit the enterprise service bus message.

16. The device of claim 15, wherein the communication establishment module is further to:
communicate control information with an established communication pathway, the control information to establish the unestablished communication pathway.

17. The device of claim 14, the unestablished communication pathway to communicate enterprise service bus messages between a portable device and a server.

18. The device of claim 14, wherein the cost of the each of the plurality of communication pathways is in view of a size of the enterprise service bus message.

* * * * *